United States Patent [19]

Earsley

[11] 4,133,588
[45] Jan. 9, 1979

[54] BALL SEPARATOR FOR BALL BEARING

[75] Inventor: Melvin L. Earsley, Lubbock, Tex.

[73] Assignee: Industrial Molding Corporation, Lubbock, Tex.

[21] Appl. No.: 867,315

[22] Filed: Jan. 6, 1978

[51] Int. Cl.$^2$ ............................................ F16C 33/38
[52] U.S. Cl. ............................. 308/201; 308/DIG. 7
[58] Field of Search ............... 308/201, 199, 189, 187, 308/193, 195, DIG. 7

[56] References Cited

U.S. PATENT DOCUMENTS

| | | | |
|---|---|---|---|
| 1,814,993 | 7/1931 | Wickland | 308/201 |
| 2,861,849 | 11/1958 | Case | 308/201 |
| 3,157,443 | 11/1964 | Draudt | 308/201 |
| 4,019,790 | 4/1977 | Earsley et al. | 308/201 |

Primary Examiner—Trygve M. Blix
Assistant Examiner—Douglas C. Butler
Attorney, Agent, or Firm—Peter J. Murphy

[57] ABSTRACT

A primarily radial load ball bearing includes an assembly of outer and inner race rings having confronting raceways for a plurality of balls, and a unitary ball separator fabricated of a moldable material such as nylon. The separator is a ring-shaped member having an annular base and annularly spaced fingers projecting axially from the base to provide annularly spaced ball pockets. The separator is configured to be received between the races to separate and space the bearing balls in the bearing. The wall surfaces of the ball pockets may be spherical or may be cylindrical generated about radial axes of the separator. The effective diameter of the pocket wall surfaces is larger than that of the balls to provide a clearance space; and the wall surfaces are provided with projections of several configurations which define ball engaging surfaces having an effective diameter still slightly larger than that of the balls to provide minimal clearance with the balls.

13 Claims, 15 Drawing Figures

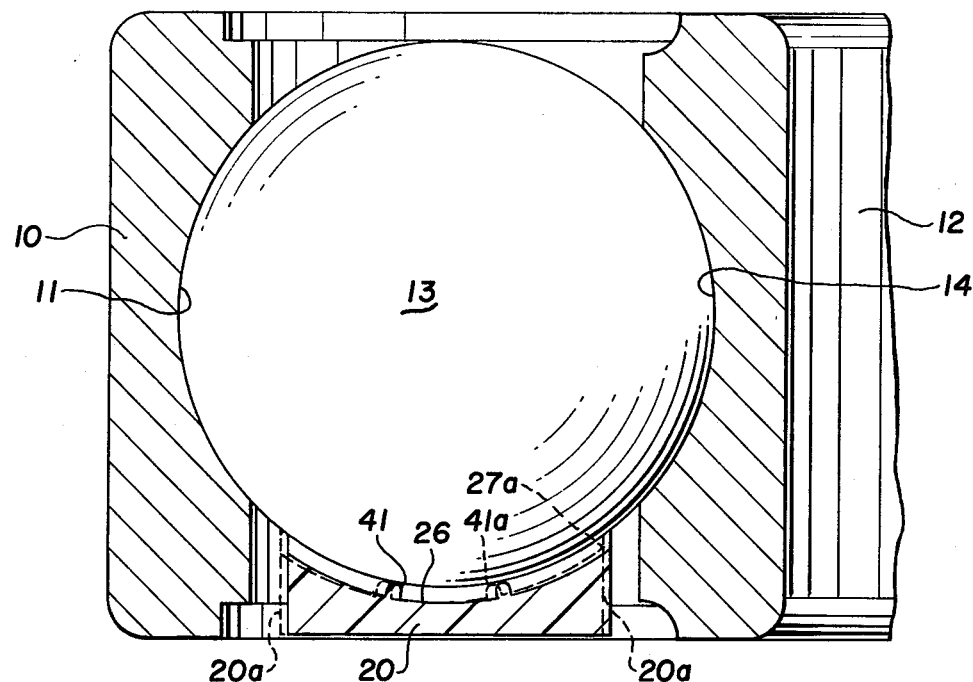
Fig. 3b
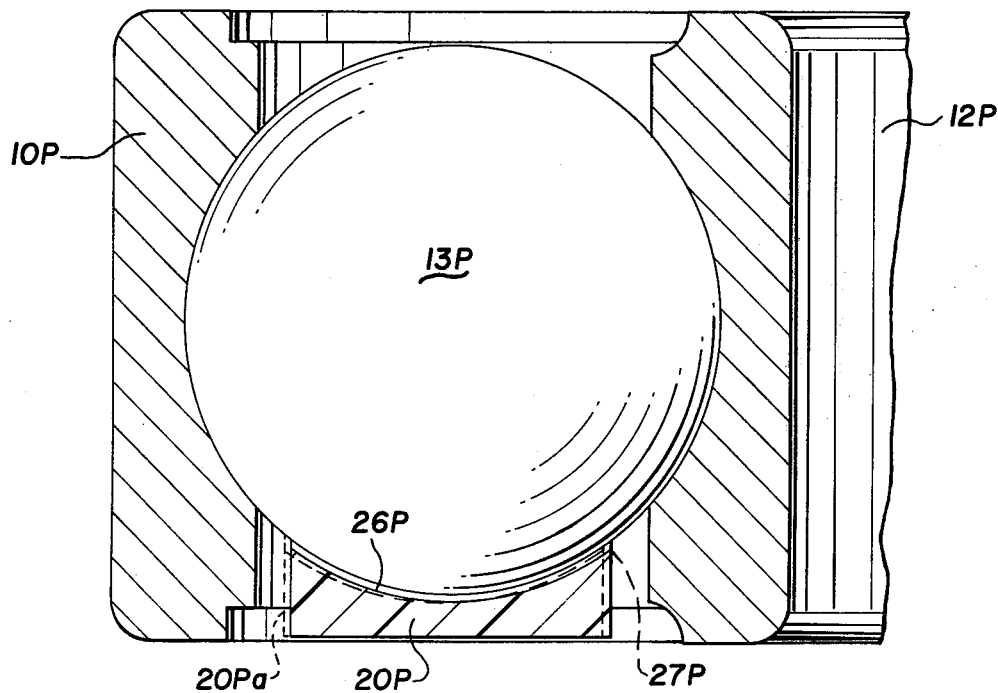
Fig. 4 - PRIOR ART

BALL SEPARATOR FOR BALL BEARING

BACKGROUND AND SUMMARY OF THE INVENTION

This invention relates to ball separators for use in ball bearings; and more particularly to molded plastic ball separators having means to minimize ball pockets to ball clearance. The term "ball separator" refers to a component of a ball bearing assembly which is also commonly known by the names "ball retainer" and "bearing cage".

A problem with ball separators which are fabricated from molded plastic such as nylon for example, is that, if the clearance between the wall surfaces of the ball pocket and the ball is too small, the bearing will tend to heat up excessively due to the friction between the ball and the pocket wall surfaces, and consequently reduce lubrication. The bearing temperature may increase by 200° F. for example. Excessive heating creates a particular problem in this type of bearing since the separator material expands much more rapidly with heat than the steel bearing races. The inherent result is that the radial expansion of the separator ring is significantly greater than the radial expansion of the races; and with a small clearance between the separator pockets and balls, this movement of the separator relative to the balls creates binding, and more friction, and more heat thereby aggravating the problem.

A related situation which further aggravates the problem is that where the ball sockets are spherical, the relatively sharp edges of the spherical pockets act to wipe lubricant from the balls; and this inherently results in less lubrication and increased friction. This problem is also further aggravated by the greater radial expansion of the separator relative to the races.

While these problems can be alleviated to some extent by increasing the ball to ball pocket clearance, this produces a relatively loose separator in the ball bearing; and this looseness of the separator may result in separator vibration and resultant noise. This separator noise may raise the overall bearing noise to an unacceptable level, particularly at high speed.

A principal object of this invention therefore is to provide a new and improved ball separator which overcomes the disadvantages of the prior art ball separators as discussed above.

Another object of this invention is to provide an improved molded plastic bearing separator with means to minimize ball to pocket wall surface clearance, and at the same time minimize ball to separator friction.

A further object of this invention is to provide an improved ball separator to minimize separator noise due to looseness of the separator, and to minimize heat buildup due to bearing to separator friction.

Still another object of this invention is to provide a molded plastic ball separator having pocket wall surface projections defining the ball engaging surfaces of the ball pockets.

These objects are accomplished in a ball separator for use in a ball bearing which includes an outer race, an inner race, and a plurality of spherical balls coacting with these races. The ball separator includes an annular base, and a plurality of annularly spaced fingers projecting generally axially from the base to define individual annularly spaced ball pockets. The ball separator has inner and outer side walls, and is configured to be received between the inner and outer races with its side walls confronting respective races. Each of the ball pockets is formed to partially enclose a respective ball, and has wall surfaces with an effective diameter larger than the diameter of a bearing ball, thereby providing clearance space between the pocket wall and the bearing ball. Each of the pocket wall surfaces has integral projections formed thereon which define ball engaging surfaces having an effective diameter slightly larger than the diameter of the ball to provide a small clearance between the projections and the ball.

More particularly, the projections for each pocket may comprise a plurality of ribs circumambienting the pocket and generally parallel with the separator side walls, a plurality of ribs traversing the wall surface of the pocket either substantially perpendicular to the separator side walls or inclined relative thereto, a plurality of relatively small pads which may be generally cylindrical in shape or dome-shaped, combinations of such ribs and pads, or traversing angled ribs which intersect one another to define lubricant retaining recesses in the wall surface.

Also more particularly the pocket wall surface may be cylindrical, being formed about a generally radial axis of the separator, or the surface may be spherical.

The novel features and the advantages of the invention, as well as additional objects thereof, will be understood more fully from the following description when read in connection with the accompanying drawings.

DRAWINGS

FIG. 3b is an enlarged radial section of a bearing assembly including a ball separator of the form illustrated in FIG. 3;

FIG. 4 is an enlarged radial section of a ball bearing assembly similar to FIG. 3b including a conventional form of ball separator;

DESCRIPTION OF THE PREFERRED EMBODIMENTS

Figure 1:
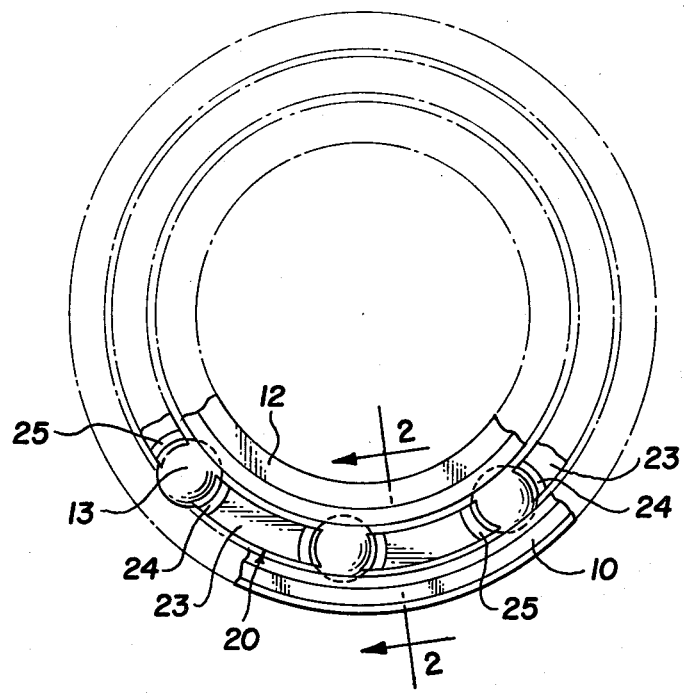
FIG. 1 is a plan view of a bearing assembly including a ball separator according to the invention.

In the drawings and in the following specification, there is described, by way of example, a ball bearing designed for primarily radial loads; and the ball separators illustrated and described for use in such bearing are preferred forms of ball separators according to the invention. It is to be understood, however, that ball separators according to the invention could be designed for use in other types of bearings such as so-called angular contact ball bearings which are designed to support substantial axial thrust loads as well as radial loads. The claims presented in this application are not intended to be limited to primarily radial load bearings, except where the claim language clearly recites such structure.

Embodiments of FIGS. 1 through 3b

Figure 2:
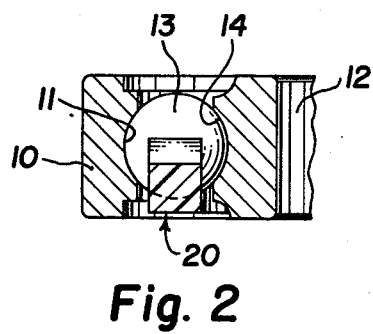
FIG. 2 is a transverse sectional view of the assembly taken in the plane 2—2 of FIG. 1.

Referring now particularly to FIGS. 1 and 2 of the drawing, the ball bearing assembly includes: an outer race ring 10, hereafter sometimes referred to as an outer race, which is a generally cylindrical ring having an arcuate raceway or groove 11 on its inner wall; an inner race ring 12, hereafter sometimes referred to as an inner race, having an arcuate raceway or groove 14 on its outer wall; with these inner and outer races and the associated raceways being so dimensioned to confine the bearing balls 13 when in assembled relation.

The inner and outer races and the bearing balls are fabricated from suitable bearing metals as are well known. A ball separator 20, as its name implies, performs the function of separating the several balls 13 from each other in the ball bearing assembly; and for this purpose provides annularly spaced pockets for the balls 13. In a separator according to the invention, each of the pockets includes means for retention on its respective ball, to provide for maximum retention of the separator in the bearing assembly. The ball retainer 20, according to the invention, is a unitary member fabricated from a suitable material, capable of being molded by a suitable technique such as injection molding. One appropriate material is a heat stabilized nylon material, which is properly annealed and stabilized for bearing applications.

Referring particularly to FIGS. 1 through 4 of the drawings, the ball separator 20 is an annular member including a continuous base 21, defining a base plane which is perpendicular to the central axis of the ball separator, and including a plurality of annularly spaced fingers 22 which extend axially from the base 21 to define, with the base, annularly spaced pockets 26. The separator base and fingers have common inner and outer cylindrical wall surfaces, providing a wall thickness which is considerably less than the diameter of the balls 13 so that the entire separator is received between the inner and outer races with suitable clearance.

Each of the fingers 22 includes a pedestal 23 for a pair of annularly separated projecting ears 24 and 25. The pedestal is identified in the drawings by its terminal surface 23, and these pedestal surfaces 23 for all of the fingers are disposed in a common plane which is parallel to the plane of the base. As illustrated in FIG. 2, this plane of the pedestals 23 is preferably disposed slightly above the parallel plane which would be defined by the centers of the ball pockets 26.

Figure 3A:
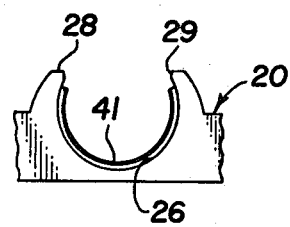
FIG. 3a is a fragmentary side view of that form.
Figure 3:
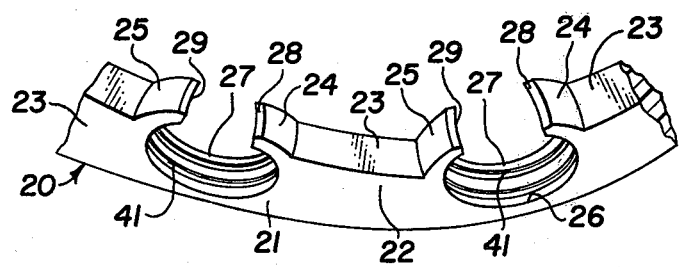
FIG. 3 is a fragmentary perspective view of one form of ball separator.

Referring to further structural details of the ears 24 and 25, as best seen in FIG. 3 the distal ends of the ears have flat tips 28; and these tips 28 are disposed in a common plane which is parallel to the plane of the pedestals and of the base. It will also be seen that the lips 29 defined by the junctures of the flatted tips 28 and the pocket walls are also flatted or beveled to relieve what would otherwise be a relatively sharp lip; and these lip surfaces may be generally cylindrical or planar and perpendicular to the base, depending on the pocket wall surface configuration which will be described.

The above described configuration of the ears 24 and 25 which project from the pedestals 23, is by way of illustration only; and reference may be had to U.S. Pat. No. 4,019,790, issued Apr. 26, 1977, for a description of various other forms of ears which may be formed to project from the pedestals 23 for other desired forms of ball separators according to the invention, such as maximum complement ball separators.

The drawings illustrate two basic forms of pocket wall surface configurations, namely spherical and cylindrical. Most of the figures of the drawing illustrate the spherical wall surface pocket 26, wherein the wall surface is continuous and spherical with a diameter somewhat larger than the diameter of the ball to be received in the pocket as will be described. Where the pocket is cylindrical, it is referred to as a straight through cylindrical pocket wherein the axis about which the cylindrical wall surface 26C is generated is a radial axis intersecting the axial center of the ball separator and generally parallel with the separator base. While these basic wall pocket surfaces are illustrated by way of example, it will be understood that other surfaces which are effectively spherical or effectively cylindrical are contemplated and the references to the diameter of the pockets refers to the effective diameter of such other pocket surface configurations within the scope of this invention. In the following specification and in the claims the expression "wall pocket surface" in singular form will be understood to include the basic wall pocket surface which may or may not be a smooth continuous spherical or cylindrical surface.

It is to be further understood that while the straight through cylindrical ball pocket 26C is illustrated only in FIG. 10, while the remainder of the figures illustrate spherical ball pockets 26, the several forms of ball pocket surface projections which will now be described may be applied and be effective for either the spherical pocket or the cylindrical pockets.

Whether the pocket wall surfaces are spherical or cylindrical, it will be seen from the drawings that the circumferential extent of the pockets is something greater than 180°, the pocket wall surfaces terminating with the lips 29 which are spaced apart a distance less than the diameter of the ball 13 which is received in the pocket. The ears 24 and 25 are yieldable, of course, to enable the separator to be snapped into the bearing assembly and the respective balls to enter each pocket. Once this assembly is completed the separator is retained within the bearing assembly by the ears. It should be noted that the several forms of projections to be described do not extend fully around the circumferential extent of the pocket wall surface, but terminate short of the lips 29.

With respect to the spherical ball pockets 26 it will be observed, as best seen in FIGS. 3 and 3b for example, that a relatively sharp lip 27 is formed at the juncture of the spherical wall surface 26 with both the outer and inner side walls of the separator. This lip 27 will have the effect, where the clearance provided between the lip and the bear ball 13 is very small, of wiping lubricant from the surface of the ball with the inherent effect of reducing the desired amount of lubricant. This will occur during normal operation of the bearing, particularly when the lips 27 come in contact with the ball. Accordingly, this is a disadvantage of the construction where the retainer is provided with a spherical wall pocket surface which has very small clearance relative to the ball.

FIG. 4 is a transverse sectional view of a prior art bearing assembly including outer and inner races 10P and 12P, balls 13P, and a ball separator 20P. The ball separator has a configuration described above including ball pockets 26P having spherical wall surface. The wall pocket surface has a relatively close clearance with the ball; and it will be seen that with any lateral movement of the separator relative to the races, one of the lips 27P may either engage the ball surface to effect the removal or reduction of the lubricant film as described. FIG. 4 particularly illustrates the situation where the separator 20P expands radially outward due to heat buildup in an operating bearing; and the expanded position is illustrated in this figure by the broken lines 20Pa. Referring to this figure, it will be seen that the retainer has shifted radially toward the left to bring the arcuate lip 27P, which is adjacent to the inner race 12, into contact with the ball surface. In this example it may be assumed, for example, that the initial clearance provided between the ball pocket surface 26P and the ball 13P is 0.006 inch; and that a radial expansion of the retainer resulting in a lateral displacement of approximately 0.010 inch will bring the inner lip 27P into engagement with the ball surface. This not only removes the lubricant film from the ball surface, but produces a binding of the separator against the ball surface to increase friction in addition to the effect of lubricant loss.

FIGS. 3 and 3a of the drawing, taken in conjunction with FIGS. 1 and 2, illustrate one form of pocket surface configuration according to the invention wherein the spherical pocket surface 26 is provided with surface projections in the form of a pair of ribs 41, which are ribs generally circumambienting the pocket, that is extending around the pocket wall surfaces generally parallel to the retainer side walls. As best seen in FIG. 3a, these ribs 41 do not extend completely around the pocket surface generally but terminate short of the confronting pocket lips 29. The ribs 41 are preferably located toward or adjacent to the center line of the ball pocket 26; and the term "center line of the ball pocket" is understood to be a line on the ball pocket surface equidistant from the side walls of the retainer and which is a projection of a cylindrical surface passing through the centers of the several ball pockets and concentric with the inner and outer retainer walls. Surface recesses or pockets are defined between the two ribs 41, and at the outer sides of the ribs, which serve to retain lubricant for deposit on the ball surface.

With the ribs 41 being located closer to the pocket center line, the following advantages will be apparent as best seen in FIG. 3b which is a transverse sectional view of a bearing assembly corresponding to FIG. 4. Referring to FIG. 3a it will be seen that the clearance provided between the spherical pocket surface 26 and the ball 13 may be considerably greater, 0.010 inch for example, and that the ribs 41 are configured to define an effective spherical ball engaging surface wherein the clearance between the ribs and the ball surface is 0.004 inch for example. FIG. 3b also illustrates, in broken lines 20a, the situation where the retainer 20 has shifted laterally toward the outer race 10 as a result of expansion due to heat. It will be seen then that the inner rib 41a has also shifted laterally and has moved somewhat closer to the ball, about 0.001 inch for example, and that the arcuate lip has also moved closer to the ball, as indicated by the lip 27a, but not into engagement with the ball. It will be seen then that the effective clearance between the ball pocket and ball remains small (0.003 inch) and that the lateral expansion of the retainer to the extent of 0.010 inch for example does not bring the arcuate lip 27 into binding engagement with the ball. The principal advantage then is that the clearance between the ball and the principal ball pocket surface 26 is increased, to produce the advantages of increased clearance, but that the effective clearance between the retainer pocket surface, as defined by the ribs 41, is maintained the same or reduced (in relation to the prior art form illustrated in FIG. 4) to minimize any looseness of the separator relative to the balls, with the resultant vibration and increased noise.

Figure 5:
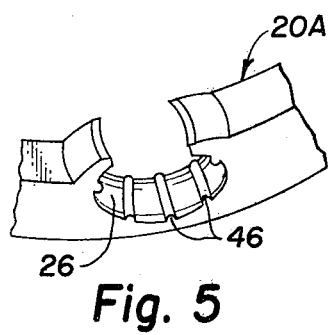
FIG. 5 is a fragmentary perspective view of another form of ball separator.
Figure 5A:
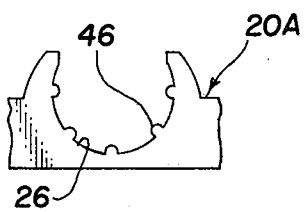
FIG. 5a is a fragmentary side view of that form.

FIGS. 5 and 5a illustrate another form of ball separator 20A according to the invention, which has the same configuration as the separator 20 including ball pockets 26 with a spherical wall surface, but wherein the projections take the form of transverse ribs 46 which are generally perpendicular to the separator side walls and which are spaced around the pocket surface 26. With this configuration the ball engaging surfaces of the ribs 45 are concentric with the spherical wall surface 26 and define a ball engaging spherical surface having a very small clearance with the ball 13. The spaces or recesses between the ribs form reservoirs for lubricant.

Figure 6:
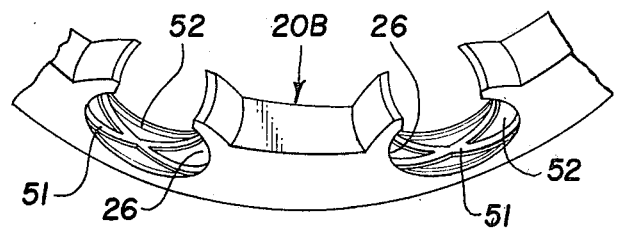
FIG. 6 is a fragmentary perspective view of another form of ball separator.

FIG. 6 illustrates a further form of ball separator 20B according to the invention, again identical to the separator 20 and including ball pockets each having a spherical wall surface 26, but wherein the projections are a pair of ribs 51 which circumambient the pocket wall surface but which are angled relative to the side walls and intersect each other at the base of the pocket. With this rib configuration, the ribs define several reservoir recesses 52 in the ball pocket for retaining lubricant.

Figure 7:
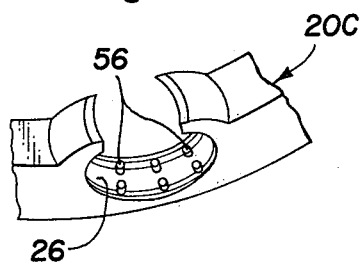
FIG. 7 is a fragmentary perspective view of another form of ball separator.
Figure 7A:
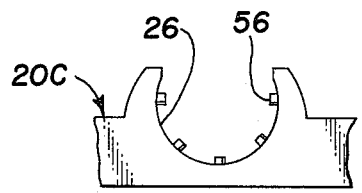
FIG. 7a is a perspective side view of that form.

FIGS. 7 and 7a illustrate still another ball separator 20C according to the invention, wherein the projections are in the form of a plurality of cylindrical pads 56 projecting from the spherical surface 26. By way of example, these pads are arranged in two circumambienting rows which are disposed relative to the pocket center line in the same manner as the ribs 41 of FIG. 3. The pads are relatively small and are shaped as cylinders, presenting relatively flat or spherical surfaces as the ball engaging surfaces. Alternatively, these pads 56 could be dome-shaped, as is illustrated in the configuration to be described subsequently. Pads such as the pads 56 do not define a surface recess for the retention of lubricant; however, these pads would assist in retaining lubricant on the pocket wall surface to be applied to the surface of the ball 13.

Figure 8:
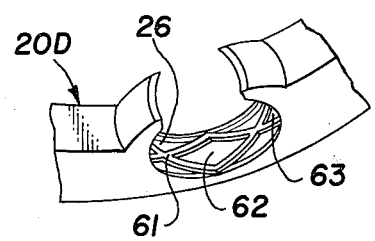
FIG. 8 is a fragmentary perspective view of another form of ball separator.

FIG. 8 of the drawing illustrates a still further form of ball separator 20D according to the invention, and is similar to the retainer 20B in that the projections are in the form of intersecting ribs 61. In this configuration the intersecting ribs define a fully enclosed lubricant recess 62 at the base of the spherical wall pocket 26, and additional recesses 63 at each side of the wall surface.

Figure 9:
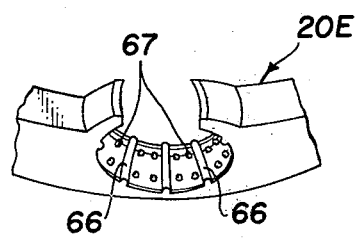
FIG. 9 is a fragmentary perspective view of another form of ball separator.
Figure 9A:
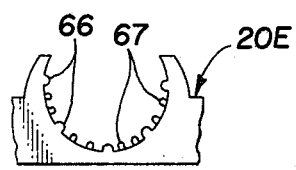
FIG. 9a is a fragmentary side view of that form.

Another form of ball retainer 20E is illustrated in FIGS. 9 and 9a; and this includes a combination of transverse ribs 66 similar to the ribs 46 in FIG. 5, and small pads 67 similar to the pads 56 in FIG. 7. In this configuration, however, the pads 67 are illustrated as dome-shaped pads rather than cylindrical pads.

Figure 10:
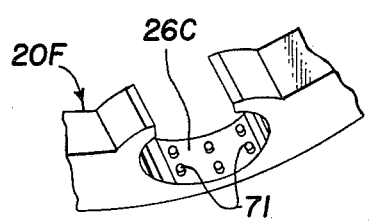
FIG. 10 is a fragmentary perspective view of still another form of ball separator according to the invention.

Still another form of ball separator 20F according to the invention is illustrated in FIG. 10; and this separator is identical to that illustrated in FIG. 7 except that the ball pockets 26C are the cylindrical pockets, previously described, rather than spherical pockets. FIG. 10 is illustrative of the use of the various forms of pocket projections, such as pads 71, in a straight through cylindrical pocket 26C.

For all of the above described forms of ball separators 20 through 20F, the projections, whether ribs or pads, would extend or project a uniform distance from the basic spherical or cylindrical pocket wall surface 26 or 26C, so that the net effect of the projections is to define a surface which is concentric with the base spherical or cylindrical wall surface.

What has been described are various forms of unitary ball separators which can be molded from a resilient or yieldable plastic material, and which have a number of advantages over prior art ball separators.

A principal feature and advantage is that the basic size of the ball pocket, whether it be spherical or cylindrical, may be made sufficiently large relative to the ball that binding and friction may be eliminated or reduced; but that the basic pocket wall surface is provided with projections which define a ball confining or ball engaging surface, and which define a corresponding effectively spherical or effectively cylindrical surface having lesser clearance with the confined balls. Because the amount of potential contact surface between the ball and the ball pocket is reduced, this clearance may be less than it might otherwise be and yet the bearing will run cooler because of the reduced friction between the balls and retainer pockets. An ancillary advantage is that the pocket surface projections serve to define recesses or pockets which will retain lubricant, and improve the distribution of lubricant to the surfaces of the balls.

A particular advantage of the lesser clearance maintained between the balls and the ball pocket surfaces, is that there is less relative movement of the separator relative to the balls; which relative movement may allow vibration of the separator within the bearing assembly particularly at high operating speeds. With the lesser clearance, such vibration is minimized; and with it is minimized the possibility of increased noise due to separator vibration.

An ancillary advantage of the invention, with respect to the use of spherical pockets which are desirable for many bearing applications, is that the diameter of the base spherical wall surface may be enlarged relative to the ball, without the usual disadvantages of simply enlarging the pocket, to substantially eliminate the possibility that the arcuate lip defined by the juncture of the ball pocket surface and the inner wall surface will come in contact with the ball as a result of radial expansion of the separator.

Different types of bearings such as radial, angular contact or thrust may respond more favorably to one or more of the projection forms shown. This is true because of the different action of the balls in different bearings, and under varying load conditions the contact area of the balls and the load zones changes in different bearing applications.

While the preferred embodiments of the invention have been illustrated and described, it will be understood by those skilled in the art that changes and modifications may be resorted to without departing from the spirit and scope of the invention.

What is claimed is:

1. In a ball separator for use in a ball bearing which includes confronting first and second races, and a plurality of spherical balls coacting with said races; said ball separator including an annular base, and a plurality of annularly spaced fingers projecting from said annular base to define individual annularly spaced ball pockets; said ball separator having opposite side walls, and being configured to be received between the outer and inner races of said ball bearing with said side walls confronting respective races; each of said ball pockets being formed to partially enclose a respective ball, and having a wall surface with an effective diameter larger than the diameter of said ball, thereby providing a clearance space between the pocket wall surface and said ball; the improvement comprising:
    each pocket wall surface having integral projections formed thereon, defining ball engaging surfaces having an effective diameter slightly larger than the diameter of said ball to provide a small clearance between said projections and said ball.

2. A ball separator as set forth in claim 1 said projections comprising a plurality of ribs traversing the wall surface of said pocket.

3. A ball separator as set forth in claim 2 said ribs traversing said pocket wall surface at an angle relative to the separator side walls, and intersecting one another to define lubricant retaining recesses in the pocket wall surface.

4. A ball separator as set forth in claim 2 said traversing ribs comprising spaced ribs generally normal to the separator side walls.

5. A ball separator as set forth in claim 1 said projections comprising a plurality of relatively small pads.

6. A ball separator as set forth in claim 5 said pads being generally cylindrical pads.

7. A ball separator as set forth in claim 5 said pads being dome-shaped pads.

8. A ball separator as set forth in claim 1 said projections comprising a plurality of ribs circumambienting said pockets generally parallel with the separator side walls.

9. A ball separator as set forth in claim 8 said circumambienting ribs comprising a pair of parallel ribs adjacent to the center of said pocket wall surface.

10. A ball separator as set forth in claim 1 said projections comprising a combination of a plurality of spaced ribs traversing the wall surface of said pocket and a plurality of generally circular pads.

11. A ball separator as set forth in claim 1 said pocket wall surfaces being formwed as cylindrical surfaces about generally radial axes of said separator.

12. A ball separator as set forth in claim 1 said pocket wall surfaces being formed as spherical surfaces.

13. A ball separator as set forth in claim 1 wherein said annularly spaced fingers project generally axially from said annular base, and wherein said ball separator has inner and outer side walls and is configured to be received between the outer and inner races of a ball bearing.

* * * * *